United States Patent [19]

Aubry et al.

[11] Patent Number: 4,924,043
[45] Date of Patent: May 8, 1990

[54] CONTACT LINK FOR FLIGHT CONTROLS OF AERODYNES

[75] Inventors: Jacques A. Aubry, Cabries; André Guillem, Marignane, both of France

[73] Assignee: Societe Nationale Industrielle et Aerospatiale, Paris, France

[21] Appl. No.: 261,438

[22] Filed: Oct. 24, 1988

[30] Foreign Application Priority Data

Oct. 23, 1987 [FR] France ................................ 87 14725

[51] Int. Cl.⁵ ...................... H01H 3/00; H01H 35/00; G01L 5/00
[52] U.S. Cl. ................................................. 200/52 R
[58] Field of Search ................. 200/25 R, 56 R, 82 C, 200/85 R, 573; 340/568; 73/787, 862.53, 862.62; 464/30, 109

[56] References Cited

U.S. PATENT DOCUMENTS

| H182 | 1/1987 | Heller | 340/568 |
| 3,937,912 | 2/1976 | Martin | 200/82 C |
| 4,051,338 | 9/1977 | Harris | 200/85 R |

FOREIGN PATENT DOCUMENTS 6051 12/1979 European Pat. Off. .
194672 9/1986 European Pat. Off. .
2225373 8/1977 France .

Primary Examiner—J. R. Scott
Attorney, Agent, or Firm—Pollock, Vande Sande & Priddy

[57] ABSTRACT

Contact link for flight controls of aerodynes, especially helicopters. The link comprises a rod (2) mounted axially slideably over a limited stroke under tension and under compression in a body (1). A leaf spring (35) subjected to compressive buckling prestress is accommodated in a recess (27) of the rod (2) between two supports (36, 37) pushed against stops of the rod (2) and stops of the body (1). Under any axial tensile or compressive force higher than the prestress of the leaf spring (35), one of the supports (36, 37) is brought nearer to the other, so that the leaf spring (35) works by buckling, and its central part increases its deflection to an extent amplified in relation to the axial stroke of the rod in the body and shifts radially a movable contact member (55) actuating an electrical contactor (45) fastened in the recess (27) of the rod (2). The contact link is used for equipping flight controls for cutting in or cutting out an automatic pilot.

14 Claims, 2 Drawing Sheets

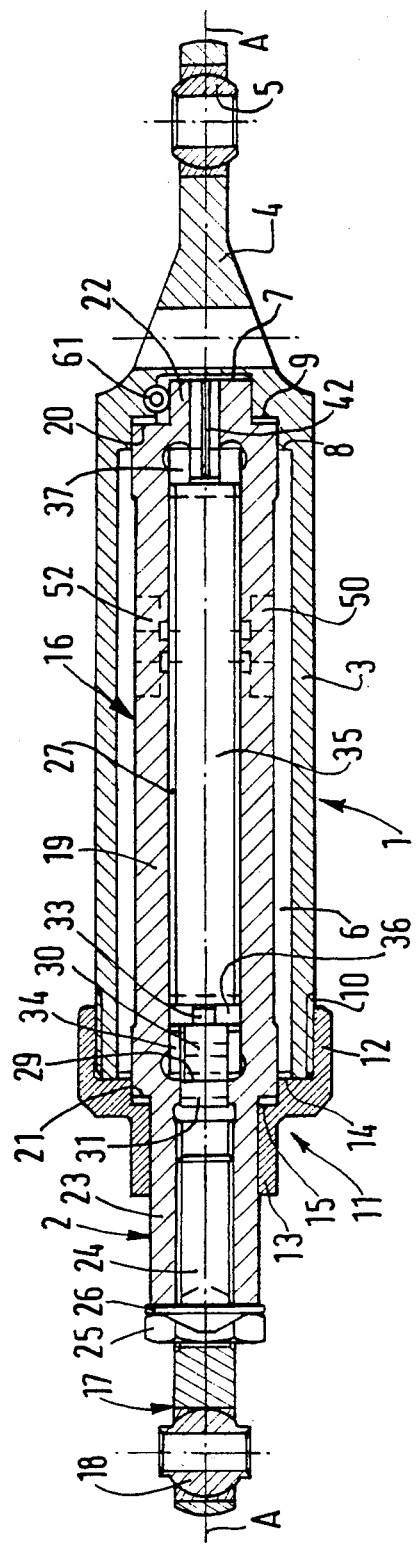

CONTACT LINK FOR FLIGHT CONTROLS OF AERODYNES

FIELD OF THE INVENTION

The present invention relates to a contact link or flight controls of aerodynes, especially helicopters, which is intended for ensuring the mechanical control of the actuation of at least one electrical contactor beyond a dynamometric operating threshold.

In particular, the invention is concerned with a force-threshold contact link constituting mechanical means making it possible, with a high degree of reliability, to control the making or breaking of an electrical contact above a certain force called the "dynamometric operating threshold", and which can be used equally under tension or compression, these mechanical means comprising, in particular, a dynamometric threshold detector actuating at least one movable contact member for tripping an electrical contactor, generally produced in the form of a microcontactor or microswitch accommodated in the link.

The contact link according to the present invention can be used particularly in aeronautics for the equipping of aerodynes, especially helicopters, and the description of the contact link will be within the framework of this latter purpose, because it seems that this is where the invention has the greatest usefulness.

The contact link according to the invention is intended to be inserted in the flight control chain between a pilot's cockpit and an automatic pilot, the function of the contact link being to short-circuit the automatic pilot when a pilot takes over the piloting again, and vice versa.

An automatic pilot comprises a complex electrical circuit, of which the opening during the change from piloting in the automatic mode to piloting in the manual mode or the closing during the change from piloting in the manual mode to piloting in the automatic mode is triggered by means of a microcontactor or microswitch changed over as the result of a shift by a specific amount of a control member actuated by the pilot, such as a lever, after this pilot has exerted a force of a likewise very specific amount on the said control member.

BACKGROUND OF THE INVENTION

French Pat. No. 2,434,377 discloses such a contact link which is mounted on the cyclic-pitch and yaw control chains of the flight controls of helicopters of medium tonnage.

Such a known link comprises two essential elements movable relative to one another, of which one is a link body and the other a link rod which is partially engaged and mounted slideably in the link body, and of which the ends forming the opposite ends of the link must be connected, by means of ball-joint sockets or forks, to the pilot's cockpit on the one hand and to a fixed point on the aerodyne on the other hand, while the electrical microcontactor serves for opening or closing the electrical circuit of the automatic pilot.

The internal arrangement of this link is such that it does not allow any relative shift between the body and the link rod, as long as the operating force exerted on the opposite ends of the link has not reached and exceeded a predetermined value, namely, the dynamometric operating threshold. This contact link thus maintains a zero play between the link rod and the link body, as long as the axial stress on the link is below the predetermined threshold value, and then the link allows a stroke of controlled amount of the link rod relative to the body so as to actuate the electrical contactor only after the threshold has been exceeded.

In this known contact link, the link body has substantially the form of a cylindrical sleeve possessing a symmetrical cylindrical axial recess with two levels, a central part of which forms a bearing of larger diameter connected by means of radial shoulders to two lateral parts forming bearings of smaller diameter. Seated in the central bearing is a ring fixed to the link rod and surrounded by another concentric peripheral ring to eliminate any radial play, while two other rings are arranged on either side of the ring fixed to the rod, and are fitted axially onto the latter during assembly, in order to form movable stops limiting the axial shifts of the rod in the body by coming in contact with stationary stops of the body which are formed by the inner radial shoulders connecting the central bearing of larger diameter to the two lateral bearings of smaller diameter in the body. Two identically prestressed helical springs bear against other inner stops of the body and exert their opposing effects on either side of the axial stack of rings fixed relative to the link rod in terms of translational movement, which is accommodated in the central part of larger diameter of the inner recess of the body, with an axial play corresponding on one side to the stroke allowed under compression and on the other side to the stroke allowed under tension. The two opposing prestressed springs, both working under compression, thus form a detector for detecting the exceeding of the dynamometric operating threshold which corresponds to the prestress load of each of the springs, and such an assembly prevents any axial shift of the rod relative to the link body whenever a tensile force or a compressive force of a value below the prestress value of the springs is exerted on the link, the link rod on the contrary shifting over the low stroke allowed under tension or compression from its position of equilibrium defined by the springs, after the load to which the link is subjected under tension or compression has exceeded the prestress threshold of the springs.

The electrical contactor, usually a quick-break microcontact, is accommodated in the body and fixed to the latter, and this contactor is actuated by the link rod by means of a device for the mechanical amplification of the stroke of the rod relative to the body. This mechanical amplifier is indispensable because the predetermined actuating stroke which the movable contact member of the electrical contactor has to be given in order to change over the latter, starting from the movement of the rod in relation to the link body, is far higher (in a ratio higher than 5) than the very low stroke which the rod must execute in the link body both under compression and under tension. Of course, at the same time, the mechanical amplifier of axial stroke or shift of the rod relative to the link body must amplify this stroke in the two directions of functioning under tension and under compression, must also have a play and a hysteresis which are virtually zero, and must be insensitive to the radial plays between the rod and the link body and to the temperature variations over a wide range extending, for example, from −80° C. to +100° C.

To meet these various requirements, the link described in the abovementioned French patent is equipped with a mechanical stroke amplifier comprising at least one amplifying pincer or lever, but preferably two opposite pincers or levers, each of which is arranged substantially axially in the body, in the position offset laterally relative to the axis of the contact link, and pivots about a pivot pin fixed to the link body. On one side of its pivot, each pincer or lever, on the same side of the end of the rod engaged in the body, has an arm, in the free end of which a notch with two contrary slopes has been made opposite a groove likewise with two contrary slopes and formed round the end of the rod inside the body. Furthermore, a ball is gripped between, on the one hand, the two contrary slopes of the groove of the rod and, on the other hand, the two contrary slopes of the notch of the end of the swan neck-shaped pincer or lever which, on the other side of its pivot on the body, is extended by a second arm coupled to the movable contact member of the electrical contactor in order to actuate it. If the mechanical amplifier comprises only a single lever or a single pincer, the electrical contactor is fastened directly to the link body, whereas if the mechanical amplifier comprises two opposing pincers or levers, the electrical contactor is fastened to the second arm of the lever which does not actuate the movable contact member of the contactor. In both embodiments, any axial shift of the rod relative to the link body under tension or compression is converted into a radial shift of the ball or balls which push back the lever or levers, the latter always pivoting in the same direction for each lever, but in opposite directions of one lever relative to the other when the amplifier comprises two symmetrically opposed levers, so that the short axial stroke of the rod in the body is thus converted into a radial stroke of much higher amplitude which is transmitted to the movable contact member of the contactor and which is sufficient for actuating the latter. To avoid the effect of the production tolerances of the components, particularly of the amplifier, which are associated with the link body, and to adjust the operation of the stroke amplifier in an appropriate way, means are also provided to allow the radial adjustment of the position of the pivots of the lever or levers of this amplifier. This is obtained by means of a movable plate which supports the pivots and which is fixed to the body by means of screws or equivalent threaded members passing through slots suitably oriented and formed in the supporting plate of the pivots.

Although such a contact link meets the various requirements set out above, it nevertheless has serious disadvantages because it comprises a large number of components without any exact adjustment both in terms of the spring detector for detecting the exceeding of the dynamometric operating threshold and in terms of the mechanical stroke amplifier; it cannot be obtained in a simple way; and its reliability is questionable since it comprises a large number of components which experience considerable wear in service. As a result of this, the production and maintenance costs of such a contact link are high.

With regard to the state of the art, mention should also be made of U.S. Pat. No. 3,902,379, which describes a quick-uncoupling link mounted in the rod assembly of a double flight control between a main cockpit occupied by a trainee pilot and an auxiliary cockpit occupied by an instructor, the quick-uncoupling link being intended to enable the instructor to obtain the remote activation of the flight controls from the auxiliary cockpit and uncoupling between the main flight controls operated by the trainee pilot and the control surfaces and other controlled members of the aircraft in an emergency. The link comprises a cylindrical body, in which a rod is engaged and immobilized in the initial position by means of a ball-type locking mechanism, the balls of which are retained in a cage fixed to the end of the rod and project into inner recesses of the cylinder under the thrust of a central cam on the end of a pin mounted axially slideably in the rod, the cam being retained in the locking position by means of a spring. An electromagnetic, pneumatic or hydraulic actuator controlled by the instructor makes it possible to shift radially a wedge, of which the surface inclined relative to the axis of the link is in contact with the conical surface of a stop carried by the pin sliding in the rod, at the end opposite that having the stop.

The radial shifting of the wedge by the actuator causes an axial shift of the pin carrying the stop counter to the spring, the effect of which is to bring about a radial shift of the balls up to a release position, allowing the link rod to slide freely in the link body. As a result of this, the control movements exerted on the link rod by the trainee pilot are no longer transmitted to the rest of the flight control chain and have no effect on the steered members.

Such a quick-uncoupling link is therefore not the type of contact link forming the subject of the invention, because it has no stroke amplifier and, above all, it is not the relative axial movements of a rod and of a body which allow the actuation of an electrical contactor, but the operation of such a contactor in order to control the functioning of an electromagnetic, hydraulic or pneumatic actuator which releases a locking device initially blocking the link rod and link body in a predetermined axial position, so as to allow them to slide freely relative to one another.

Furthermore, the French Pat. No. 2,570,672 discloses a double automatic tab and power control system for equipping aircraft, which, in a flight control chain between a pilot control and a control surface, comprises an automatically functioning force sensor/comparator with a single throw-over switch with integral midpoint, this device being intended to avoid the need for locating the point of equilibrium of a control surface. This device comprises essentially a cylinder connected at one end to a pilot control and closed at its other end by means of a cover, and a double-acting piston mounted axially slideably in this cylinder, in which the piston is subjected to the opposing actions of two identical prestressed compression springs. The axial stroke of the piston is limited by two stops formed by metal washers connected to electrical conductors feeding a micromotor for controlling the tab of the control surface. The piston is fixed to a force transmission rod which passes radially through two diametrically opposed axial slots made in the cylinder and which is fixed to two branches of a control fork connected to the control surface, these two branches being mounted axially slideably in flats of the cover, but being fixed in terms of rotation relative to the latter. When the axial load to which this device is subjected both under compression and under tension exceeds the prestress threshold of the springs, the piston is shifted from its position of equilibrium until it comes in contact with one of the two stops and thus makes an electrical contact allowing the feeding of the tab control micromotor, so as to cause the control surface to pivot in the direction returning it to its aerodynamic position of equilibrium.

This device therefore has some similarity to the contact link described in French Pat. No. 2,434,377, inasmuch as it is certainly the relative axial shift of a rod and of a body beyond a predetermined force threshold which controls the making of an electrical contact. However, this device does not ensure any stroke amplification, and because of this it cannot be used satisfactorily for the purposes under consideration.

The same is true of the contactor-type safety device described in French Pat. No. 1,131,880 and in its second Patent of Addition No. 70,535, which relates to a composite system of manual and automatic control for aircraft.

This composite control system is a hydroelectric or hydromechanical system capable of ensuring the control of a hydraulic control-surface actuation servomotor according to one or the other of two operating modes, one of which ensures control by hydroelectric means in response to an electrical control signal generated either as a result of the operation of a manual control member or by an automatic pilot, while the other ensures control by hydromechanical means solely in response to the manual control member. In such a system, the contactor-type safety device is at the same time designed as an elastically yielding coupling produced so as normally to ensure transmission without flexibility, whatever the forces necessary for obtaining the shift of the manual control member corresponding to the shift of the control surface, but yield elastically when exceptional forces are exerted on this manual control member, for example, when a sufficient force is exerted on it by the pilot, and switching members are provided in order to be actuated when this coupling yields elastically by an amount exceeding a predetermined value. The contactor coupling of this system comprises two elements, one of which is connected to the output of the control-surface actuation servomotor, while the other is connected to the manual control lever. The rod assemblies for connection to the two elements in the region of the contactor coupling are substantially coaxial, and the arrangement is such that the axial shift of one of the elements ensures the axial shift of the other element, despite a spring subjected to a preload and arranged between two stops set apart from one another and located in an annular receptacle of one of the elements, being capable of moving freely in the axial direction on an extension of the other element. The contacts of the contactor are then opened if, between the two basic elements of the device, there is a relative axial shift which exceeds a predetermined amount, i.e., if the spring experiences the effect of an overload. As an example, one of the elements can carry a pair of pistons, so that the spring stresses these pistons towards fixed positions on the element by means of which each of them is shifted elastically, when the force transmitted to it from the corresponding stop of a pair of stops provided on the other element exceeds the thrust force of the spring. In the system which is the subject of French Pat. No. 1,131,880, a single contactor coupling is used and is mounted between a link connected by means of a mechanical differential to the control surface or to the output of the servomotor actuating this control surface and, on the other side, to a pivoting lever, itself actuated by the manual control lever. In the second Patent of Addition No. 70,535 to the above-mentioned patent, the system comprises two contactor couplings which bend elastically at different force thresholds and of which one is interposed in the mechanical connection between the manual control member and an artificial feeler device, while the other is interposed in the linkage between the artificial feeler device and the control-surface actuation servomotor or the said control surface. The opening of the contacts of these contactor couplings opens an electrical circuit which is designed to cause a reversal of the system, in order to change it to a hydromechanical working mode from the hydroelectric working mode. However, in these various embodiments, there is no amplification of the axial stroke of one of the elements in order to actuate the corresponding contactor.

SUMMARY OF THE INVENTION

The object of the invention is, therefore, to provide a contact link of the type described in French Pat. No. 2,434,477, all the essential functions of which it performs, but is of improved structure so as to be considerably simplified, of likewise simplified adjustment, of increased reliability and also, consequently, of considerably reduced production and maintenance cost.

To this end, the invention provides a contact link for flight controls of aerodynes, especially helicopters, which is intended for ensuring the mechanical control of the actuation of at least one electrical contactor beyond a dynamometric operating threshold, and which comprises:

- a link body which comprises an essentially tubular part and one end of which has means for connection to and articulation on a support,
- at least one electrical contactor accommodated in the link body and equipped with at least one movable contact member with a specific actuating stroke,
- a link rod shiftable axially relative to the body by means of a rod part engaged and mounted slideably in the said tubular part of the body, over an axial stroke less than the actuating stroke of the movable contact member of the contactor and delimited between two mechanical stops of the body, the end of the rod outside the body likewise having means for connection to and articulation on a support,
- a detector for detecting the exceeding of the dynamometric operating threshold, which comprises, in the link body, at least one prestressed spring stressing the rod elastically and allowing the shifting of the rod relative to the body only when the rod is subjected, counter to the spring, to a stress of which the axial component under tension or compression exceeds the said threshold, and
- a mechanical amplifier of the stroke of the rod relative to the body, the said amplifier being actuated by the rod and itself actuating the said movable contact member of the contactor over a stroke at least equal to the said specific actuating stroke when the rod is shifted relative to the body over its entire stroke under tension or compression, in order to actuate the electrical contactor, and, according to the invention such a contact link is defined in that one member simultaneously forms the stroke amplifier and the detector for detecting the exceeding of the dynamometric operating threshold, this member being a leaf spring which works under compressive buckling and each of the two ends of which bears against a spring support which is mounted axially slideably relative to the link body on the one hand and relative to the link rod on the other hand, and which is pushed by the compression-prestressed leaf spring directly or indirectly against at least one of two stops, of which one is a stop of the body and the other a stop of the rod, so that any axial shift of the rod relative to the body under compression or tension causes a compression of the leaf spring between one spring support bearing against a stop of the body and the other spring support bearing against a stop of the rod.

This reduces the number of components and any possibility of axial play between the amplifier on the one hand and the threshold-exceeding detector on the other hand, because these two devices are simlultaneously formed by a single prestressed spring which, according to an embodiment which at the same time is simple and ensures a high amplification ratio, is a leaf spring working under compressive buckling. It will be appreciated that, in such an embodiment, a single leaf spring of relatively small bulk replaces the two opposing helical compression springs used in the contact links of the state of the art, also the mechanical amplifier with one or two swan: neck-shaped pincers provided on the contact link of French Pat. No. 2,434,377, and furthermore all the connecting members between the threshold-exceeding detector on the one hand and the axial-stroke amplifier on the other hand. Moreover, to reduce the number of components even further and to eliminate the mechanical plays attributable to the transmission of forces and/or movements, the movable contact member of the contactor is advantageously directly in contact with the central part of the leaf spring and is actuated by this central part.

In a simple and practical embodiment ensuring both a clean bearing of the ends of the spring on the corresponding supports having reduced friction and good guidance of the spring supports in terms of axial translational motion, each of the latter has a part which is equipped with a V-shaped notch, in which the corresponding end of the leaf spring is engaged and bears, and which is fixed in terms of axial translational motion relative to at least one transverse wing extending substantially radially relative to the part equipped with the notch, thus forming a movable stop interacting with the corresponding stops of the body and of the rod, in order respectively to limit the shift of the corresponding spring support in the body or shift it together with the rod in the body.

To obtain a high stroke amplification ratio and at the same time increase the compactness of the assembly, the leaf spring is advantageously accommodated substantially axially in a recess made in the rod part mounted slideably in the link body. Furthermore, the recess in the rod is advantageously made in a portion of larger cross-section which is delimited axially between two radial shoulders of the rod and which slides in a receptacle within the said tubular part of the body and delimited axially between two inner radial shoulders of the body forming the mechanical stops of the body limiting the axial shifts of the rod relative to the body as the result of contact with the said shoulders of the rod. In such an embodiment, it is thus advantageous if each spring support is guided axially slideably in a respective one of the two axial end parts of the recess of the rod.

Advantageously, when each spring support comprises a part equipped with a notch for receiving one end of the leaf spring and at least one radial wing, the recess of the rod is produced in such a way that it extends transversely in the rod and opens radially into the receptacle of the body via at least one axially elongate slot, preferably via two opposing slots on either side of the axis of the link, each spring support being fixed in terms of axial translational motion relative to at least one radial wing, but preferably two opposing radial wings, of which the outer radial end projects beyond a corresponding slot into the receptable of the body, to form the corresponding movable stop interacting with another shoulder within the body or a shim of set thickness bearing against this other shoulder, forming the corresponding stop of the body for limiting the shift of the spring support, while at least one of the axial ends of the recess forms the corresponding stop of the rod which interacts with the said movable stop in order to drive the spring support together with the rod in the body.

In an advantageously simple exemplary embodiment, the inner radial shoulders of the body which form the stops of the body limiting the respective shifts of the rod and, if appropriate with a shim of set thickness interposed, of a spring support towards the outside of the body, on the same side of the means of connection and articulation of the rod, are formed by stepped shoulders in an annular detent and closing plug for one axial end of a cylinder of the body which forms the essence of the tubular part of the link body.

Moreover, the spring support fixed in terms of axial translation motion relative to the movable stop interacting with a rod stop formed by one axial end of the recess is advantageously and simply guided in terms of axial translational motion relative to the rod by means of at least one elastic positioning pin which is fixed to this spring support, preferably its central part equipped with the corresponding V-shaped notch, this pin being accommodated and mounted axially slideably in an axial bore made in the rod.

According to a simplified structure, this spring support has its part equipped with a V-shaped notch central and in one piece with two opposing transverse wings, together with which the part equipped with a notch delimits a small axial bore, in which one end of the elastic pin is seated.

Furthermore, to allow the adjustment of the dynamometric operating threshold of the threshold-exceeding detector, i.e., the compression threshold of the prestressed leaf spring, it is advantageous if the contact link according to the invention possesses means for adjusting the prestress of the leaf spring, these means of adjustment ensuring an adjustable axial positioning of at least one of the spring supports relative to the rod.

In a preferred embodiment, these means of adjustment comprise at least one first member which is threaded and screwed in a position axially adjustable relative to the rod, and at least one second member which is shifted axially by means of the first threaded member and which possesses, on the one hand, an axial portion, on which one spring support is mounted axially slideably, and, on the other hand, a bearing stop for the said spring support, this bearing stop forming the stop of the rod towards which the spring pushes the corresponding spring support.

In an example of advantageously simple structure of the means for adjusting the prestress of the leaf spring, the threaded member is a screw, the threaded shank of which is screwed into an adjusting nut arranged in an axial end part of the recess of the link rod and the screw head of which is seated in the bottom of an axial bore passing through a sleeve axially extending the link rod part mounted slideably in the body, the screw head being accessible from outside the link via the interior of this sleeve, so as to be driven in rotation in one direction or the other in order to adjust its axial position relative to the link rod, and the second member of the means of adjustment is formed by a substantially cylindrical end portion of reduced cross-section of the screw shank, which projects axially into the recess of the link rod and which forms the axial portion engaged slideably in a bore of the spring support; in this case, the bearing stop is formed by the free end face of the end portion of reduced cross-section or by a shoulder connecting this end portion of reduced cross-section to the rest of the screw shank, so that the leaf spring pushes the support up against the bearing stop, thus pushing the screw axially back in the direction pushing the adjusting nut towards or up against the corresponding axial end of the recess of the link rod, the nut having two opposing transverse wings projecting radially out of the recess of the link rod and into the receptacle of the link body, in order to be pushed towards or up against the corresponding stop of the body, limiting the shifts of the corresponding spring support on one side, or the shim of set thickness laid against this stop of the body.

Advantageously, in this case, so that the contact link is of adjustable length, the link rod also possesses an end piece which is threaded on one end part engaged and screwed in the sleeve in an adjustable axial position and the other end part of which projects out of the link body and carries the means for the connection and coupling of the link rod.

In order to reduce the bulk of the contact link, especially in the radial direction, the electrical contactor can be accommodated in the recess of the rod and be fastened to the latter. In this case, to improve the compactness of the assembly and ensure better interaction between the leaf spring and electrical contactor, the movable contact member of specific actuating stroke of the contactor is a member in contact against the concave face of the leaf spring and supported in an adjustable radial position by an actuating lever extending substantially axially in the recess and mounted pivotably on the contactor.

BRIEF DESCRIPTION OF THE DRAWINGS

The present invention will be better understood and other advantages and characteristics of the invention will emerge from a reading of the following description of a particular exemplary embodiment described with reference to the accompanying drawings, in which:

FIG. 2 is a view, partly in side elevation and partly in section, of the contact link of FIG. 1, a section taken in a plane perpendicular to that of FIG. 1; and FIG. 3 is a sectional view along line III—III of FIG. 1.

DESCRIPTION OF PREFERRED EMBODIMENT

Figure 1:
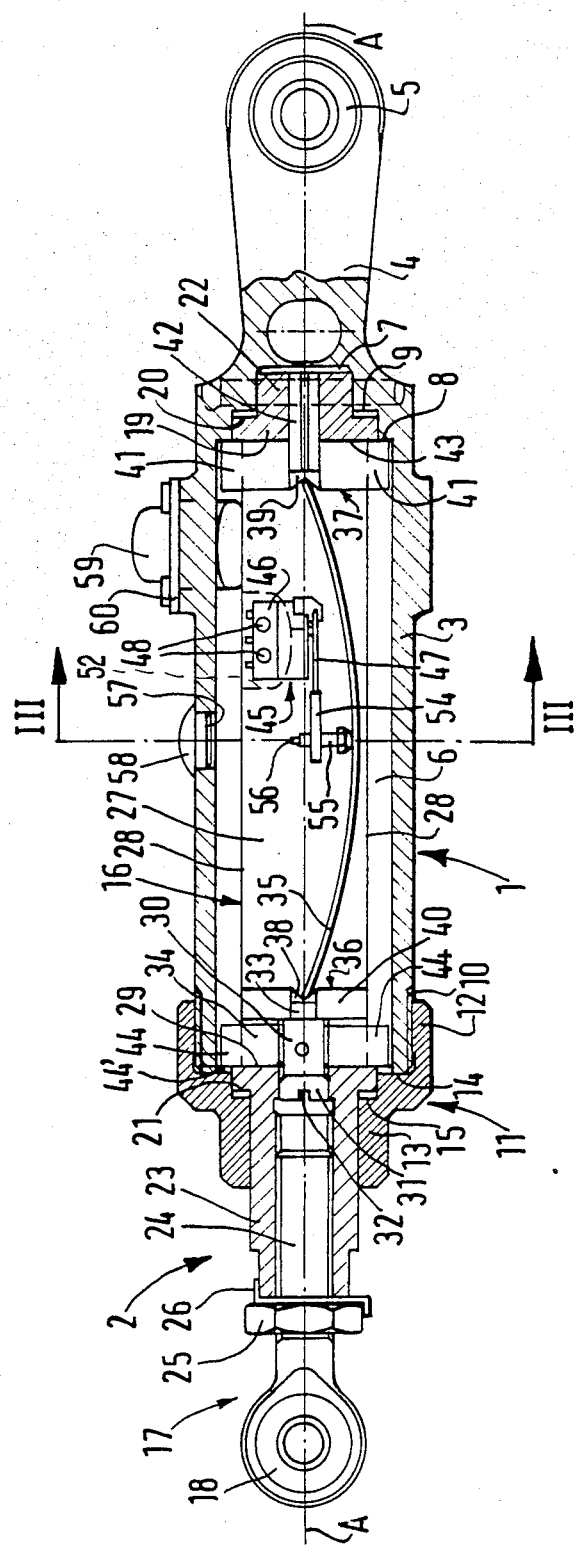
FIG. 1 shows a longitudinal axial section through a contact link in a plane perpendicular to the plane of the leaf spring, the latter being prestressed between the two supports at its ends.

The contact link illustrated in FIGS. 1 to 3 comprises two main mechanical subassemblies, namely, a tubular link body 1 and a link rod or slide 2, said rod being partially engaged coaxially in the body 1 and being mounted axially slideably relative to this body 1 over a short stroke both under tension (in a direction tending to cause the rod 2 to come out of the body 1) and under compression (in the opposite direction, tending to cause the rod 2 to enter the body 1).

The body 1 comprises a cylinder 3 closed at one end 4 which is extended axially and shaped as a ball-joint socket 5, for making an articulated connection between the link body 1 and the control linkage of the aerodyne upstream of the members of the automatic pilot.

The cylinder 3 over most of its length, delimits an inner receptacle comprising a main axial bore 6 of larger diameter which is connected, on the same side as the ball-joint socket 5, to a coaxial end counterbore 7 of smaller diameter by means of two inner stepped shoulders, of which one is a radial shoulder 8 in an outer position and the other is a radial shoulder 9 in an inner position. The other, open end of the cylinder 3 has an external thread 10 and is closed by means of a removable annular detent plug 11. This plug 11 has an axial end part in the form of an internally threaded cylindrical flange 12, by means of which the plug 11 is screwed externally onto the thread 10 of the body 1, and the other axial cylindrical end 13 of the plug 11 has passing through it an axial bore coaxial relative to the bore 6 and to the counterbore 7 of the body 1. Furthermore, the inner face of the flange 12 is connected to the surface of the bore of the cylindrical end 13 by means of two inner stepped shoulders, of which one is a radial shoulder 14 in an outer position and the other is a radial shoulder 15 in an inner position, substantially of the same annular cross-section as the inner radial shoulder 9 at the bottom of the main bore 6 of the body 1, and directly and axially opposite this shoulder 9. The outer radial shoulder 14 of the plug 11 has an outer annular part which forms a radial stop limiting the driving of the plug 11 onto the cylinder 3 during screwing, when the plug 11 is being installed on this cylinder 3, and, after the plug 11 has been installed on the cylinder 3, the inner annular part of the shoulder 14 forms a shoulder directly and axially opposite the shoulder 8 at the bottom of the cylinder 3 and substantially of the same cross-section as this shoulder 8.

The link slide or rod 2 is composed of a main part 16 essentially engaged in the body 1 and of an end piece 17 mounted removably on the part 16 and equipped with a ball joint 18 for making an articulated connection between the slide 2 and a control linkage (not shown) operated by the pilot. The main part 16 of the slide 2 has a central portion 19 of larger cross-section or radial section (perpendicularly to the axis A common to the body 1 and to the slide 2) which is delimited axially between two radial shoulders 20 and 21 formed on the part 16 and, on the latter, connecting the central portion 19 respectively to a small axial end portion 22 of smaller cross-section, less than that of the blind counterbore 7 at the bottom of the body 1 and to a coaxial sleeve 23 at the opposite axial end, this sleeve 23 having a cross-section slightly less than that of the bore in the cylindrical end 13 of the plug 11. Moreover, the axial distance separating the two radial shoulders 20 and 21 of the slide 2 is equal to the axial distance separating the radial shoulders 9 and 15 to the body 1. less the sum of the strokes of the slide 2 under tension and compression in the body 1, starting from the position of equilibrium of the slide 2 relative to the body 1, under the effect of the stress of the spring, as described below. In this example, since the maximum stroke under tension and the maximum stroke under compression must each be equal to 0.15 mm by virtue of construction, the axial distance separating the two shoulders 20 and 21 on the slide is 0.3 mm less than the axial distance separating the two shoulders 9 and 15 of the body 1 from one another.

Furthermore, the cross-section of the central portion 19 is slightly less than that of the two axial bores which are of an axial dimension greater than the total stroke of the slide 2 in the body 1 and which are delimited in the body 1 one between the shoulders 8 and 9 and the other between the shoulders 14 and 15 of the body 1.

As a result, the rod or slide 2 is mounted axially slideably in the body 1 by means of its main part 16, the central portion 19 of which is accommodated in the inner receptacle 6 of the body 1 and is movable in translational motion in this receptacle 6, at the same time being guided axially by means of its ends which slide without any appreciable radial play in the bores delimited between the shoulders 8, 9 and 14,15 of the body 1, the axial stroke of the rod 2 being limited as a result of the abutment of the stops formed on the rod 2 by the shoulders 20 and 21 against the stops formed on the body 1 by the shoulders 9 and 15. Simultaneously, the rod 2 is guided axially in its movements relative to the body 1 by means of its small axial end portion 22 which is engaged and slides axially in the counterbore 7 at the bottom of the body 1, and by means of its sleeve 23 which passes through the plug 11 and slides axially without any appreciable radial play in the central bore of this plug 11.

The ball joint 28 of the removable end piece 17 is retained in a widened head which this end piece 17 possesses at the end, free and outside the body 1 and the sleeve 23, of a rod, the threaded part 24 of which is screwed in an adjustable axial position in the internally threaded central axial bore of the sleeve 23 which opens into the free end of this sleeve 23 on the side opposite to the body 1. The locking of the end piece 17 in the desired axial position relative to the sleeve 23 of the rod 2 is obtained by means of a lock nut 25 screwed onto the threaded rod 24 and clamped against a nut retention device 26 interposed between the lock nut 25 and the sleeve.

A recess 27 in the portion 19 of the slide 2 extends axially over most of the length of this portion 19. Transversally, in a first direction perpendicular to the axis A of the link, the recess 27 extends diametrically across the entire rod portion 19 (see FIG. 1) and symmetrically relative to the corresponding diametral plane, while the width of the recess 27 in the second transverse direction perpendicular both to the axis A and to the first transverse direction (see FIG. 2) is limited to a value much lower than its axial length. The recess 27 thus formed in the portion 19 of the rod 2 is a relatively narrow elongate recess which opens into the receptacle 6 within the body 1 via two axial slots 28 opening into diametrically opposite parts of the rod portion 19.

This recess 27 is limited, on the same side as the sleeve 23, by an axial end face 29, into which opens coaxially a small smooth counterbore made through the bottom of the sleeve 23 and of the adjacent axial end of the rod portion 19, and this small counterbore opens into the bottom of the internally threaded bore of the sleeve 23. Seated in this smooth counterbore is the head 31 of the screw 30, the threaded shank of which is screwed into a nut 34 seated and mounted axially slideably relative to the rod 2 and the body 1 in the adjacent axial end part of the receptacle 27. The head 31 of the screw 30 has a diametral actuating slot 32 in its face turned towards the end piece 17, so that, when this end piece is unscrewed and removed from the sleeve 23, the screw head 31 is accessible from outside the link by means of a screwdriver introduced into the sleeve 23, making it possible to drive the screw head 31 in rotation in one direction or the other, in order to adjust the axial position of the screw 30 relative to the nut 34 which is pushed elastically towards or up against the end face 29 of the recess 27 by a spring described below. The threaded shank of the screw 30 projects beyond the nut 34 into the recess 27 and is extended axially by a substantially cylindrical thinned end portion 33 of reduced cross-section relative to the rest of the screw 30. This thinned end portion 33 connected to the rest of the screw 30 by means of a radial shoulder thus projects completely into the recess 27 beyond the nut 34 in a position axially adjustable as a result of the screwing or unscrewing of the screw 30 relative to the nut 34.

A leaf spring 35 is accommodated substantially axially in the recess 27, and this spring 35 is under compressive prestress and works by buckling between two spring supports 36 and 37 which are each mounted axially slideably relative to the rod 2 and the body 1, respectively in one of the axial end parts of the recess 27 and in the corresponding axial end part of the receptacle 6 of the body 1. Each of the two advantageously semi-cylindrical ends of the leaf spring 35 is engaged in a V-shaped notch, until it abuts up against the flanks of this notch which opens out towards the middle of the recess 27 and which is made in a central part 38 or 39 of the corresponding support 36 or 37.

On the same side as the nut 34 and the screw 30, the support 36 comprises, on either side of its central part with a notch 38 centered on the axis A, two opposing radial wings 40 extending transversally up to the slots 28, without projecting into the receptacle 6 of the body 1. These two wings 40 define between them and relative to the central part 38 a small bore of the support 36 and in which the thinned end portion 33 of the screw 30 is received axially slideably.

On the other side, towards the small rod portion 22, the spring support 37 likewise comprises two opposing radial wings 41 on either side of its central notched part 39 centered on the axis A, but these extend transversally beyond the lateral slots 28 of the recess 27 and project into the receptacle 6 of the body 1. Moreover, these wings 41 delimit on the support 37, relative to the central notched part 39 of the latter, a small axial bore, in which is retained an end part of an elastic positioning pin 42 engaged axially slideably in a central bore made through the small rod portion 22 and through the adjacent end of the rod portion 19.

Thus, the spring supports 36 and 37 are stressed elastically by the leaf spring 35 which is under buckling prestress and is therefore curved and which tends to keep them apart from one another, and the wings 41 of the support 37 form movable stops which the leaf spring 35 pushes, on the one hand, up against or towards the shoulder 8 of the body 1, forming the stationary stop of the body 1 limiting the axial shifts of the spring support 37 relative to the body 1 and, on the other hand, up against or towards the axial end face 43 of the recess 27 on the same side as the end piece 4 of the body 1, this face 43 forming a stop on the rod 2 which limits the axial shifts of the support 37 relative to the rod 2.

The other support 36 is pushed back by the leaf spring 35, so that its wings 40 are up against the shoulder connecting the thinned portion 33 to the rest of the screw 30. Thus, the latter is likewise pushed back, so that the nut 34, in which it is screwed, is always pushed up against or towards the end face 29 of the recess 27, this end face 29 forming a stop on the rod 2 for limiting the shifts of the nut 34 and therefore of the spring support 36 relative to the rod 2. Moreover, the nut 34 also has opposing lateral wings 44 extending transversally beyond the lateral slots 28 of the recess 27 and thus projecting into the receptacle 6 of the body 1. As a result of the effect of the leaf spring 35 and of the bearing of the support 36 on the screw 30, these wings 44 of the next 34 are pushed back towards the radial shoulder 14 of the body 1, more specifically towards or up against an annular shim 44' surrounding the rod portion 19 and engaged in the entrance of the cylinder 3 and up against the shoulder 14 of the plug 11. This shim 44' is of a set thickness in order, during assembly, to compensate the axial distance between the shoulder 14 of the plug 11 of the body 1 and the end face 29 of the recess 27 of the rod 2.

Thus, the end faces 29 and 43 of the recess 27 and the radial shoulder between the thinned portion 33 and the rest of the screw 30 form stops carried by the rod 2 for limiting the axial shifts of the spring supports 36 and 37 and the nut 34 relative to the rod 2. In an alternative version, the end face turned towards the support 36 on the thinned portion 33 of the screw 30 can serve as a stop which limits the stroke of the support 36 relative to the screw 30 and against which the support 36 is pushed by the leaf spring 35. In both cases, the support 36 and the nut 34 are fixed in terms of axial translational motion relative to the rod 2 of the body 1, and the wings 44 of the nut 34 form movable stops pushed towards or up against the shim 44', itself bearing against the stationary stop of the body 1 formed by the shoulder 14. These wings 44 of the nut 34 guide the support 36 axially in the recess 27 and in the receptacle 6 during the relative movements between the rod 2 and the body 1, as explained below. Similarly, the other support 37 is guided axially in the recess 27 and in the receptacle 6 by means of its wings 41 and in the small rod portion 22 by means of the elastic pin 42.

In this assembly, it will be appreciated that the screw 30 is a screw for adjusting the prestress of the leaf spring 35 curved between its supports 36 and 37. In fact, the adjustment of the axial position of the screw 30 relative to the nut 34 makes it possible to adjust the axial position of the support 36 relative to the nut 34 and therefore to move the supports 36 and 37 away from or toward to one another, thus varying the amount of buckling prestress of the leaf spring 35 which corresponds to the dynamometric operating threshold of the link.

Finally, the contact link possesses an electrical microcontactor or cutout or changeover switch 45 accommodated in the recess 27 of the rod 2 and fastened to the latter. This microcontactor 45 of known conventional structure comprises a housing 46 containing contact terminals and at least one movable breaker which is normally laid elastically against the terminals in order to close an electrical circuit connected to these terminals. The breaker or breakers are moved away from the terminals counter to elastic means stressing them in the housing 46, in order to open the electrical circuit, as a result of the tilting of an arm 47 projecting out of the housing 46 on which this arm 47 is mounted pivotably.

The housing 46 of the microcontactor 45 is suspended in the recess 27 by means of two transverse screws 48, the raised heads 49 of which are retained in a countersink 50 machined in the outer face of the rod portion 19, the shanks of the screws 48 passing parallel to one another through the bottom of this countersink 50, the housing 46, two spacers 51 for wedging the housing 46, which are located on either side of this housing and between the latter and the opposite sides of the recess 27, and finally the bottom of another countersink 52 which is likewise machined in the outer face of the rod portion 19 symmetrically relative to the countersink 50 in relation to the diametral plane of the recess 27 and in which two nuts 53 are each screwed onto the threaded end of the shank of one of the two screws 48 (see FIG. 3). The supporting screws 48 of the housing 46 are perpendicular to the diametral plane of the recess 27, and the housing 46 is arranged in such a way that its arm 47 extends axially in the recess 27 (see FIG. 1). The end of this arm 47 carries an axial stage 54 having a radial internally threaded bore, into which is screwed in a radially adjustable position the shank 55 of a screw 55, the head of which is in contact against the concave face of the middle of the leaf spring 35. This screw 55 constitutes a movable contact member of specific actuating stroke, the substantially radial shift of which causes the tilting of the arm 47 in order to actuate the microcontactor 45 and open the electrical circuit to which this contactor is connected. The free end of the shank of the screw 55 has a diametrically slotted end piece 56 to allow the screw to be driven in rotation in one direction or the other about its axis, so as to adjust the radial position of the screw 55 relative to the stage 54 and consequently the radial position of contact between the screw 55 and the leaf spring 35 by means of a screwdriver introduced into the recess 27 via an orifice 57 made in the wall of the cylinder 3 and, after adjustment, closed off by means of a removable plastic plug 58 snapped into the orifice 57.

The terminals of the microcontactor 45 are connected to an electrical circuit of the automatic pilot, located outside the link, by means of conductor wires (not shown) which connect them to the terminals (not shown) of a connector 59 with a base 60 screwed onto the outer face of a portion of extra thickness of the cylinder 3. The electrical connection of the contact link thus takes place directly at the connector 59.

Finally, in order to immobilize the rod 2 in terms of rotation relative to the body 1 by means of the small rod portion 22 in the counterbore 7 of the body 1, there can be an elastic pin 61 (see FIG. 2) seated in a transverse bore made in the bottom of the cylinder 3 and represented by broken lines in FIG. 1, but allowing free axial movement of the rod portion 22 in the counterbore 7 of the body 1.

The contact link, the structure of which has just been described with reference to FIGS. 1 to 3, functions as follows. The initial position shown in FIGS. 1 and 2 is a position of equilibrium, under the effect of the leaf spring 35 under compressive prestress, in which, on the one hand, the spring support 37 is pushed by the leaf spring 35 simultaneously up against the stop formed on the rod 2 by the axial end of the recess 27 and up against the stop formed on the body 1 by the shoulder 8 and, on the other hand, the spring support 36 is pushed by the leaf spring 35 up against the bearing stop on the screw 30, in such a way that the nut 34 is simultaneously pushed up against the stop formed on the rod by the axial end 29 of the recess 27 and the stop formed on the body by the shoulder 14 of the plug 11 via the shim 44'. The value of the dynamometric operating threshold or of the initial prestress of the leaf spring 35 was set by actuating the screw 30 and corresponds, for example, to a value of 22.48 lbs. If the axial component of a compressive or tensile force exerted on the link does not exceed this threshold value, the leaf spring 35 opposes any axial shift of the rod 2 relative to the body 1. If this threshold value is exceeded under compression, the leaf spring 35 bends to a greater extent and works by buckling under the effect of the compression which it undergoes between its support 37, retained against the shoulder 8 of the body 1, and its support 36 which is brought nearer to the support 37 because it is shifted together with the screw 30 and the nut 34, itself driven by the stop face 29 of the rod 2. The rod 2 thus executes its stroke under compression in the cylinder 1, this stroke of an amplitude of 0.15 mm being completed when the shoulder 20 of the rod abuts up against the shoulder 9 of the leaf body. Conversely, if the prestress threshold value of the leaf spring 35 is exceeded under tension, the leaf spring 35 is likewise bent to a greater extent by buckling under compression between its support 36, which remains immobile because it is linked in terms of movement to the nut 34 up against the shim 44', and the support 37 which is brought nearer to the support 36, being driven together with the rod 2 by the stop surface 43 on the latter. The stroke under tension of 0.15 mm of the rod 2 relative to the body 1 is completed when the shoulder 21 of the rod abuts against the shoulder 15 of the cover 11 of the body 1. Consequently, whether the rod 2 is shifted under tension or compression over its entire stroke in the body 1, the prestressed spring 35 undergoes compressive buckling, and the deflection of its central part increases in relation to the initial deflection of the spring 35 by an amount amplified in a high ratio relative to the axial stroke of the rod in the body 1 under tension or under compression. In this example, the variation in the deflection of the central part of the spring 35 is of the order of 1 mm, and this means that the screw 35 is shifted substantially radially over a stroke of 1 mm and that the arm 47 is pivoted a sufficient amount to actuate the electrical microcontactor 45. Advantageously, the microcontactor 45 and the radial position of the screw 55 relative to the stage 54 of the arm 47 will be adjusted in such a way that the differential stroke for tripping the microcontactor 45 is within the ideal zone of the radial stroke of the movable actuating contact 55. In other words, the radial stroke of this movable actuating contact 55 will correspond to an approach stroke, followed by a stroke for the actual tripping of the microcontactor 45, followed finally by a safety stroke, and the amplitude of the stroke for the actual tripping of the microcontactor can be of the order of 0.12 mm. It is thus ensured that the microcontactor 45 will be actuated, as soon as the rod 2 has executed its entire stroke under tension or compression in the body 1, after the link has been subjected to a stress the axial component of which has exceeded the prestress threshold of the leaf spring 35.

The contact link described above differs from the similar prior art devices in that the amplification of the movement necessary for controlling the microcontactor 45 is obtained directly in the region of a single leaf spring 35 which is prestressed and which at the same time forms the detector for detecting the exceeding of the dynamometric operating threshold of the link under tension and under compression. The microcontactor 45 is controlled directly as a result of the movement of the middle of the leaf spring 35 which works by buckling. This arrangement makes it possible to obtain a high amplification of the movement, which is a function of the initial buckling deflection. Furthermore, the prestress load varies only very slightly according to the initial buckling deflection. In the practical example mentioned above, the amplification of the movement is of the order of 7, and the variation in force under a deflection of 0.15 mm is virtually negligible and of the order of 0.08 daN for an initial load of 22.48 lbs.

In comparison with the contact links of the prior art, it can be seen that the link provided above comprises only a small number of components, requires only simplified adjustment and has high reliability. The result is also that the production cost of such a contact link can be reduced considerably in relation to that of prior contact links.

We claim:

1. A contact link for flight controls of aerodynes, for ensuring mechanical control of the actuation of at least one electrical contactor (45) beyond a dynamometric operating threshold, said contact link comprising
   (a) a link body (l) comprising a substantially tubular part (3) and having an end (4) which has means for connection to and articulation on a support;
   (b) at least one electrical contactor (45) accommodated in the link body (l) and equipped with at least one movable contact member (55) having a predetermined actuating stroke;
   (c) a link rod (2) shiftable axially relative to the body (l) by means of a rod part (16) which is engaged and slideably mounted in said tubular part (3), over an axial stroke less than said predetermined actuating stroke of the movable contact member (55) and defined between two mechanical stops (9, 15) of the body (1), an end of the rod (2) outside the body (1) having means (18) for connection to and articulation on a support;
   (d) a detector for detecting the exceeding of the dynamometric operating threshold, said detector, in the link body (1), comprising at least one prestressed spring (35) stressing the rod (2) elastically and allowing shifting of the rod (2) relative to the body (1) only when the rod (2) is subjected, counter to the spring (35), to a stress of which the axial component under tension or compression exceeds said threshold; and
   (e) a mechanical amplifier of the stroke of the rod (2) relative to the body (1), said amplifier being actuated by the rod (2) and itself actuating said movable contact member (55) of the contactor (45) over said predetermined actuating stroke when the rod (2) is shifted relative to the body (1) over its entire stroke under tension or compression, in order to actuate the electrical contactor (45);
   (f) wherein said prestressed spring (35) is a leaf spring deformed in compressive bucking and constituting both said detector for detecting the exceeding of the dynamometric operating threshold and said stroke amplifier for activating said contactor (45), opposite ends of said leaf spring abutting against two spring supports (36, 37) mounted axially slideable relative to the link body (1) and to the link rod (2), said spring supports being biased by said leaf spring subjected to compressive prestress against at least one of a stop (8, 14-44') of said body (1) and a stop (29, 43) of said rod (2);
   (g) whereby any axial shift of said rod (2) relative to said body (1), under tension or compression, causes a supplementary compression of said leaf spring (35) between one of said spring supports (36 or 37) bearing against a stop of said body (1) and the other of said spring supports bearing against a stop of said rod (2), said leaf spring 935) being further directly in contact by its central part with said movable contact member (55) of said contactor (45), whereby, as soon as the axial tension or compression stress to which said link is subjected exceeds the value of the axial prestress in compressive buckling of said leaf spring (35), lateral deflection of said leaf spring increases and resulting transversal displacement of said central part of said leaf spring is substantially amplified with respect to its axial deformation and actuates said movable contact member (55) of said contactor (45) with a stroke greater than the displacement of said link rod (2) relative to said link body (1).

2. A contact link as claimed in claim 1, wherein each spring support (36, 37) comprises a part (38, 39) comprising a V-shaped notch receiving and supporting an end of the leaf spring (35), and which is fixed in terms of axial translational motion relative to at least one transverse wing (41, 44) extending substantially radially relative to the part (38, 39) comprising the notch, and forming a movable stop interacting with corresponding stops of the body (1) and of the rod (2) in order selectively to limit the shift of the spring support (36, 37) in the body (1) and drive it together with the rod (2) in the body (1).

3. A contact link as claimed in claim 1 or 2, wherein said leaf spring (35) is accommodated substantially axially in a recess (27) made in said rod part (16) mounted slideably in said link body (1).

4. A contact link as claimed in claim 3, wherein said recess (27) of the rod (2) is made in a portion (19) of larger cross-section which is delimited axially between two radial shoulders (20, 21) of the rod and which slides in a receptacle (6) within said tubular part (3) of the body (1) and defined axially between two inner radial shoulders (9, 15) of the body (1) which form said mechanical stops of the body limiting axial shifts of the rod relative to the body as a result of contact with said shoulders (20, 21).

5. A contact link as claimed in claim 3, wherein each spring support (36, 37) is guided axially slideably in a respective one of the two axial end parts of the recess (27) of the rod (2).

6. A contact link as claimed in claim 5, wherein said recess (27) extends transversally in the rod (2) and opens radially into said receptacle (6) of the body (1) via at least one axially elongate slot (28), each spring support (36, 37) being fixed in terms of translational motion relative to at least one radial wing (41, 42) the outer radial end of which projects beyond a corresponding slot (28) into the receptacle (6) of the body (1), to form said corresponding movable stop interacting with another shoulder (8, 14) within the body (1) or a shim (44') of set thickness bearing against said another shoulder (14), forming said corresponding stop of the body (1), to limit the shift of said spring support (36, 37), while at least one of the axial ends (39, 43) of the recess (27) forms said corresponding stop of the rod (2) which interacts with said movable stop in order to drive said spring support (36, 37) together with the rod (2) in the body (1).

7. A contact link as claimed in claim 6, wherein the inner radial shoulders (14, 15) of the body (1) which form the stops of the body limiting respective shifts of the rod (2) and, if appropriate with a shim (44') of set thickness interposed, of a spring support (36) towards the outside of the body (1), on the same side as the means (18) for connection and articulation of the rod (2), are formed by stepped shoulders (14, 15) in an annular detent plug (11) for closing one axial end of a cylinder (30) of the body (1) which essentially forms said tubular part of the body.

8. A contact link as claimed in claim 6, wherein the spring support (37) fixed in terms of translational motion relative to the movable stop (41) interacting with a rod stop (43) formed by one axial end of the recess (27) is guided for axial translational motion relative to the rod (2) by means of at least one elastic pin (42) which is fixed to said spring support (37), preferably to its central part (39) equipped with said V-shaped notch, and which is seated and mounted axially slideably in an axial bore in the rod (22).

9. A contact link as claimed in the claim 8, wherein said spring support (37) has its central part (39) equipped with a V-shaped notch central and in one piece with two opposing transverse wings (41), together with which the central part (39) equipped with a notch defines a small axial bore, in which one end of the elastic pin (42) is seated.

10. A contact link as claimed in claim 5, having means (30, 34) for adjusting the prestress of the leaf spring (35), said means of adjustment ensuring adjustable axial positioning of at least one of the spring supports (36) relative to the rod (2).

11. A contact link as claimed in claim 10, wherein said means of adjustment comprise at least one first member (30) which is threaded and screwed in a position axially adjustable relative to the rod (2), and at least one second member (33) which is shifted axially by means of a first threaded member (30) and which has an axial portion on which a spring support (36) is mounted axially slideably, and a bearing stop of said spring support (36), said bearing stop forming said stop of the rod, towards which the spring (35) pushes said spring support (36).

12. A contact link as claimed in claim 11, wherein said threaded member is a screw (30) having a threaded shank which is screwed into an adjusting nut (34) arranged in an axial end part of the recess (37) of said link rod (2), said screw having a head (31) seated in the bottom of an axial bore passing through a sleeve (23) axially extending the link-rod part (19) mounted slideably in the body (1), said screw head (31) being accessible from outside the link via the interior of said sleeve (23) so as to be driven in rotation in either direction in order to adjust its axial position relative to the rod (2), and said second member of the means of adjustment is formed by a substantially cylindrical end portion (33) of reduced cross-section of the shank of the screw (30), said shank projecting axially into the recess (27) of the link rod (2) and forming said axial portion engaged slideably in a bore to said spring support (36), said bearing stop being formed by a free end face of said end portion of reduced cross-section or by a shoulder connecting said end portion to the rest of the screw shank. so that the leaf spring (35) pushes said support (36) up against said bearing stop, thus pushing said screw (30) axially in the direction pushing said adjusting nut (34) towards the corresponding axial end (29) of the recess (27) of the link rod, said nut (34) having two opposing transverse wings (44) projecting radially out of the recess (27) of the link rod and into the receptacle (6) of the link body (1), in order to be pushed towards the corresponding stop (14) of the body (1), limiting on one side the shifts of the corresponding spring support (36), or a shim (44') of set thickness laid against this stop of the body (14).

13. A contact link as claimed in claim 12, wherein the link rod (2) also has an end piece 917) which is threaded on one end part (24) engaged and screwed in an adjustable axial position in said sleeve (23) and the other end part of which projects out of the body (1) and carries said means (18) of connection and coupling of the link rod (2).

14. A contact link as claimed in claim 4, wherein the electrical contact (45) is accommodated in the recess (27) of the link rod (2) and is fastened to the link rod, and its movable contact member (55) of specific actuating stroke is a member in contact against the concave face of the leaf spring (35) and supported in an adjustable radial position by a lever (47, 54) extending substantially axially in the recess (27) and mounted pivotably on the contactor (45) in order to actuate it.

* * * * *